United States Patent [19]
Tatsuke et al.

[11] 3,833,345
[45] Sept. 3, 1974

[54] METHOD FOR INHIBITING THE FORMATION OF SLUDGE IN FUEL OILS

[75] Inventors: Shogo Tatsuke, Chiba; Osamu Yanagisawa; Toshiaki Kaneko, both of Yokohama, all of Japan

[73] Assignee: Nippon Yusen Kaisha, Tokyo, Japan

[22] Filed: Dec. 28, 1970

[21] Appl. No.: 102,037

[30] Foreign Application Priority Data
May 2, 1970   Japan..........................45/37199
Dec. 27, 1969   Japan..........................44/104829

[52] U.S. Cl. .................................................. 44/63
[51] Int. Cl.............................................. C10l 1/20
[58] Field of Search.......................... 44/63; 424/263

[56] References Cited
UNITED STATES PATENTS

| | | |
|---|---|---|
| 2,446,792 | 8/1948 | Shelton et al...................... 424/263 |
| 2,446,796 | 8/1948 | Van Campen, Jr................. 424/263 |
| 2,786,797 | 3/1957 | Lederer ............................... 424/263 |
| 2,975,042 | 3/1961 | Summers, Jr. .......................... 44/56 |
| 3,192,021 | 6/1965 | Eckert .................................... 44/63 |

*Primary Examiner*—Daniel E. Wyman
*Assistant Examiner*—Mrs. Y. H. Smith
*Attorney, Agent, or Firm*—William J. Daniel

[57] ABSTRACT

Fuel oil is stabilized against sludge formation by means of an organic cationic quarternary ammonium bactericidal agent such as an alkyl pyridinium or picolinium halide.

8 Claims, No Drawings

METHOD FOR INHIBITING THE FORMATION OF SLUDGE IN FUEL OILS

This invention relates to an additive for fuel oils, a stabilized fuel oil composition containing the additive and a method for inhibiting the formation of sludge in fuel oils, especially heavy oil.

It is well known that storage of fuel oils, especially heavy oil, for a long period of time permits the formation of sludge which causes clogging of strainers in shipping and contamination of various tanks. Such sludge has hitherto been considered as a heavy viscous substance resulting from the oxidative polymerization of asphaltene in heavy oil. Thus, the inhibition of oxidative polymerization of asphaltene, as by means of the addition of a petroleum-sulfonate, naphthenate or ester of a polyhydric alcohol and a higher fatty acid, and the like, to heavy oil has been universally considered the key to preventing the formation of sludge.

After making a variety of researches on the cause of the formation of sludge in heavy oil, it has been found that sludge of the type in question is formed not by oxidative polymerization of asphaltene at all, but by the action of microorganisms present in heavy oil wherein they propagate themselves and embrace asphaltene and the like in their colony thereby causing agglomeration of asphaltene and the like and that, consequently, the formation of sludge can thus be prevented by inhibiting propagation of microorganisms.

It is a purpose of this invention to provide an additive for fuel oils which is capable of inhibiting the formation of sludge without influencing the properties of the oil which are desirable from the fuel standpoint.

It is another purpose of this invention to provide a fuel oil composition stabilized with said additive against the formation of sludge during long-term storage.

It is a further purpose of this invention to provide a method for effectively inhibiting the formation of sludge in fuel oils, especially heavy fuel oils.

Still further objects and advantages will become apparent as the following description proceeds.

In accordance with this invention, these objectives can be attained by the addition to the oil of an additive prepared by dissolving into a suitable organic solvent at least one bactericide selected from the group consisting of alkylpyridinium halides and alkylpicolinium halides and at least one surfactant selected from the group consisting of cationic surfactants and non-ionic surfactants, if necessary, by the aid of a dissolution promoting agent.

In this invention, alkylpyridinium halides and/or alkylpicolinium halides, wherein alkyl contains from about eight to 20 C atoms, are employed as a bactericidal agent. As examples of said alkylpyridinium halides can be mentioned laurylpyridinium chloride, myristylpyridinium chloride, cetylpyridinium chloride, stearylpyridinium chloride and the corresponding bromides and iodides. Said alkylpicolinium halides may be those derived from any one of alpha-picoline, beta-picoline and gamma-picoline. Examples of the alkylpicolinium halides include laurylpicolinium chloride, myristylpicolinium chloride, cetylpicolinium chloride, stearylpicolinium chloride and the corresponding bromides and iodides. Especially preferable as the bactericidal agents are laurylpyridinium chloride and cetylpyridinium chloride.

These pyridinium and picolinium compounds may be used alone or in mixtures of more than one.

As the pyridinium and picolinium compounds per se inherently are incompatible with fuel oils, these compounds are preferably not added alone to the oil. Rather, it has been found that these compounds can be incorporated homogeneously into fuel oils in admixture with at least one surfactant selected from the group consisting of cationic surfactants and non-ionic surfactants. Anionic surfactants are not preferred, as they react with the pyridinium or picolinium compounds utilized as the bactericidal agent and form a precipitate. Acetates of long chain alkylamines, dialkyldimethylammonium chloride, etc., are preferably used as the cationic surfactant, while polyoxyethylenealkylamine, ethylene oxide adducts of aliphatic alcohols, etc., are preferably used as the non-ionic surfactant. Any solvent that can dissolve the admixture of bactericidal agent and surfactant can be used in this invention, but a hydrocarbon oil such as kerosene is usually employed. Preferably, use is made of a dissolution assistant such as a lower alkylene glycol, such as ethylene glycol and propylene glycol, and a liquid polyol, such as glycerol in the amount of about 0.2–1.0 part per part of bactericidal agent.

In a preferred embodiment of this invention, the bactericidal agent and the surfactant in a mixing ratio by weight of from 1:2 to 2:1 are dissolved in a possibly minimal amount of the organic solvent and mixed thoroughly therein. In this case, a small amount, e.g., 0.4 parts of alkylene glycol or glycerol per part of the bactericidal agent may be added as dissolution assistant.

The resulting solution is added in an amount sufficient to provide 20–500 ppm, preferably 50–200 ppm, of the pyridinium compound to the fuel oil, e.g., Diesel oil. If the amount of the pyridinium compound is less than 20 ppm, bactericidal effect will not be sufficiently exhibited. If desired, the compound may be used in an amount exceeding 500 ppm, but the effect will not be enhanced proportionally.

The fuel oil composition thus treated substantially prevents the formation of sludge when stored for a long period of time. The fuel oil composition does not cause clogging of a strainer when used as Diesel oil and serves to decrease the frequency of cleaning needed for various tanks or other storage containers.

This invention will be explained more in detail by the following examples which are given merely for the purpose of illustration and are not intended to limit the scope of this invention. In the results of test performed in each example, the symbols arbitrarily used for evaluation have the following meanings:

| Symbol | Degree of Inhibition of the Propagation of Microorganisms in the Stock Oil |
| --- | --- |
| ++++ | Perfect Inhibition |
| +++ | Good Inhibition |
| ++ | Some Inhibition |
| + | Slight Inhibition |
| 0 | No Inhibition |

EXAMPLE 1

A composition containing the following ingredients was prepared:

| | | |
| --- | --- | --- |
| Kerosene (JIS Grade No. 1) | 100 | ml. |
| Laurylpyridinium chloride | 10.0 | g. |

-Continued

| | | |
|---|---|---|
| Adduct of laurylamine & 10 mols of ethylene oxide | 8.0 | ml. |
| Ethylene glycol | 4.0 | ml. |

Eight 50 cc Elrenmayer flasks were charged each with 20 cc of Marine Diesel oil (supplied by General Oil Co.). Said composition was then added in amounts necessary to provide the different amounts of laurylpyridinium chloride shown in Table 1 to prepare samples.

The samples were then innoculated each with 1 ml. of an incubated liquid of microorganisms prepared by incubating for 24 hours in an agar culture medium a sludge obtained from Marine Diesel oil which had been stored for a long period of time. The samples were placed in a constant temperature bath maintained at 37°C where the microorganisms were incubated for 72 hours. The samples were then taken from the constant temperature bath and the state of propagation of microorganisms was observed, the result being shown in Table 1 below.

Table 1

| Sample No. | Quantity of Laurylpyridinium Chloride Added (ppm) | Evaluation |
|---|---|---|
| 1 | 1,000 | ++++ |
| 2 | 200 | ++++ |
| 3 | 100 | ++++ |
| 4 | 50 | ++++ |
| 5 | 20 | ++++ |
| 6 | 10 | ++ |
| 7 | 5 | ++ |
| 8 | 0 | 0 |

As is evident from the above result, the propagation of the microorganism is effectively inhibited in the samples containing at least 20 ppm of the bactericide.

EXAMPLE 2

A composition containing the following ingredients was prepared:

| | | |
|---|---|---|
| Kerosene (JIS Grade No. 1) | 100 | ml. |
| Laurylpyridinium chloride | 10.0 | g. |
| Adduct of oleyl allyl ether and 8 mols of ethylene oxide | 8.0 | g. |
| Ethylene glycol | 4.0 | ml. |

This composition was added to the same Marine Diesel oil as in Example 1 and a test on propagation of bacteria was performed as in Example 1. The result of the test is shown in Table 2 below.

Table 2

| Sample No. | Quantity of Laurylpyridinium Chloride Added (ppm) | Evaluation |
|---|---|---|
| 1 | 1,000 | ++++ |
| 2 | 200 | ++++ |
| 3 | 100 | ++++ |
| 4 | 50 | ++++ |
| 5 | 20 | ++++ |
| 6 | 10 | +++ |
| 7 | 5 | ++ |
| 8 | 0 | 0 |

EXAMPLE 3

A composition containing the following ingredients was prepared:

| | | |
|---|---|---|
| Kerosene (JIS Grade No. 1) | 100 | ml. |
| Laurylpyridinium chloride | 10.0 | g. |
| Laurylmethallyldimethylammonium chloride | 5.0 | ml. |
| Ethylene glycol | 4.0 | ml. |

This composition was added to the same Marine Diesel oil as in Example 1 and a test on propagation of bacteria was performed according to a procedure similar to that described in Example 1. The result of the test is shown in Table 3 below.

Table 3

| Sample No. | Quantity of Laurylpyridinium Chloride Added (ppm) | Evaluation |
|---|---|---|
| 1 | 1,000 | ++++ |
| 2 | 200 | ++++ |
| 3 | 100 | ++++ |
| 4 | 50 | ++++ |
| 5 | 20 | ++++ |
| 6 | 10 | ++++ |
| 7 | 5 | +++ |
| 8 | 0 | 0 |

EXAMPLE 4

A composition containing the following ingredients was prepared:

| | | |
|---|---|---|
| Kerosene (JIS Grade No. 1) | 100 | ml. |
| Laurylpicolinium chloride (derived from beta-picoline) | 10 | g. |
| Adduct of laurylamine and 10 moles of ethylene oxide | 8 | g. |
| Ethylene glycol | 4 | g. |

Seven 50 cc Elrenmayer flasks were charged each with 15 ml. of Marine Diesel oil (supplied by Mobil Oil Co.). Said composition was then added in an amount necessary to provide the different amounts of laurylpicolinium chloride shown in Table 4 to said Marine Diesel oil.

The mixture in the flask was innoculated with 5 cc of an incubated liquid prepared by incubating for 24 hours in an agar culture medium a sludge formed in the same Marine Diesel oil. The flasks were placed in a constant temperature bath maintained at 37°C where incubation was effected for 72 hours. The flasks were then taken from the constant temperature bath and the state of propagation of bacteria was observed. The result is shown in Table 4 below.

Table 4

| Sample No. | Quantity of Laurylpicolinium Chloride Added (ppm) | Evaluation |
|---|---|---|
| 1 | 200 | ++++ |
| 2 | 100 | ++++ |
| 32 | 50 | ++++ |
| 4 | 20 | +++ |
| 5 | 10 | ++ |
| 6 | 5 | + |
| 7 | 0 | 0 |

EXAMPLE 5

A composition containing the following ingredients was prepared:

| | |
|---|---|
| Kerosene (JIS Grade No. 1) | 100 ml. |
| Cetylpicolinium bromide (derived from gamma-picoline) | 10 g. |
| Adduct of laurylamine and 10 mols of ethylene oxide | 10 g. |
| Ethylene glycol | 4 g. |

This composition was added to the same Marine Diesel oil as in Example 4 and the mixture was subjected to a test on propagation of bacteria performed in a manner similar to that described in Example 4. The result is shown in Table 5 below.

Table 5

| Sample No. | Quantity of Cetylpicolinium Bromide Added (ppm) | Evaluation |
|---|---|---|
| 1 | 200 | ++++ |
| 2 | 100 | ++++ |
| 3 | 50 | ++++ |
| 4 | 20 | +++ |
| 5 | 10 | ++ |
| 6 | 5 | + |
| 7 | 0 | 0 |

EXAMPLE 6

A composition containing the following ingredients was prepared:

| | |
|---|---|
| Kerosene (JIS Grade No. 1) | 100 ml. |
| Laurylpicolinium chloride (derived from beta-picoline) | 10 g. |
| Laurylmethallyldimethylammonium chloride | 8 g. |
| Ethylene glycol | 4 g. |

This composition was added to the same Marine Diesel oil as in Example 4 and the mixture was subjected to a test on propagation of bacteria performed in a manner similar to that described in Example 4. The result is shown in Table 6 below.

Table 6

| Sample No. | Quantity of Laurylpicolinium Chloride Added (ppm) | Evaluation |
|---|---|---|
| 1 | 200 | ++++ |
| 2 | 100 | ++++ |
| 3 | 50 | ++++ |
| 4 | 20 | +++ |
| 5 | 10 | +++ |
| 6 | 5 | ++ |
| 7 | 0 | 0 |

EXAMPLE 7

The composition described in Example 1 was added at a rate of about 1 ml./liter to fuel oils for ships belonging to Nippon Yusen Kaisha (N.Y.K.) and a test had been made over almost one year to determine how the life of fuel strainers for continuous use was prolonged. The result is shown in Table 7 below.

Table 7

| Run No. | Name of Ship | Life of Fuel Strainer for Continuous Use (Hours) | |
|---|---|---|---|
| | | No Composition Added | Composition Added |
| 1 | Kaga-maru | 4 | 120 |
| 2 | Yamanashi-maru | 24 | 336 |

Table 7-Continued

| Run No. | Name of Ship | Life of Fuel Strainer for Continuous Use (Hours) | |
|---|---|---|---|
| | | No Composition Added | Composition Added |
| 3 | Saikyo-maru | 4 | 240 |
| 4 | New York-maru | 48 | 240 |

Inspection of Setting tank and Service tank in the Kaga-maru for checking the state of deposition of sludge showed that a large amount of sludge was deposited in 30 days when no additive was added, while sludge was scarcely deposited even after 180 days when the additive was added.

What is claimed is:

1. A method for inhibiting the formation of sludge in heavy fuel oils, characterized by adding to heavy fuel oils an inhibiting amount of an alkylpyridinium halide or alkylpicolinium halide wherein alkyl contains about eight to 20 carbon atoms.

2. A method for inhibiting the formation of sludge in fuel oils as in claim 1 wherein such halide compound is added in an amount of about 20 – 1000 ppm.

3. A method for inhibiting the formation of sludge in fuel oils as in claim 1 wherein said halide compound is added together with at least one surfactant selected from the group consisting of cationic surfactants and non-ionic surfactants in a weight ratio of 1:2–2:1.

4. A method for inhibiting the formation of sludge in fuel oils as in claim 1 wherein said compound is selected from the group consisting of laurylpyridinium halides, cetylpyridinium halide, laurylpicolinium halides and cetylpicolinium halides.

5. A method for inhibiting the formation of sludge in fuel oils as in claim 1 wherein said compound is selected from the group consisting of laurylpyridinium halides, cetylpyridinium halides, laurylpicolinium halides and cetylpicolinium halides and said surfactant is selected from the group consisting of a dialkyldimethylammonium halide, a polyoxyethylenealkylamine and adducts of ethylene oxide with an aliphatic alcohol.

6. An additive for heavy fuel oils which comprises a mixture of at least one compound selected from the group consisting of alkylpyridinium halides and alkylpicolinium halides and at least one surfactant selected from the group consisting of cationic surfactants and non-ionic surfactants in a weight ratio of 1:2 – 2:1.

7. An additive for heavy fuel oils which comprises a solution in a hydrocarbon solvent of a mixture of at least one compound selected from the group consisting of laurylpyridinium halides, cetylpyridinium halides, laurylpicolinium halides and cetylpicolinium halides, at least one surfactant selected from the group consisting of dialkyldimethylammonium halides, polyoxyethylenealkylamine and adducts of ethylene oxide with aliphatic alcohols, and at least one dissolution promoting agent selected from the group consisting of lower alkylene glycols and glycerol, the surfactant being present in a weight ratio of 1:2 to 2:1 relative to said compound and said dissolution agent being present in the amount of 0.2–1.0 parts per part of said compound.

8. A stabilized fuel oil composition consisting essentially of heavy fuel oil containing at least one alkylpyridinium halide or alkylpicolinium halide bactericidal agent in an amount of at least about 20 ppm, wherein alkyl contains about eight to 20 carbon atoms.

* * * * *